United States Patent
Miura et al.

(10) Patent No.: US 11,486,301 B2
(45) Date of Patent: Nov. 1, 2022

(54) GAS TURBINE COMBUSTOR, AND GAS TURBINE

(71) Applicant: Mitsubishi Heavy Industries, Ltd., Tokyo (JP)

(72) Inventors: Keisuke Miura, Tokyo (JP); Shohei Uramoto, Tokyo (JP); Tomoya Murota, Tokyo (JP); Yuki Kamikawa, Yokohama (JP); Shingo Yoshida, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 34 days.

(21) Appl. No.: 16/710,117

(22) Filed: Dec. 11, 2019

(65) Prior Publication Data
US 2020/0240326 A1    Jul. 30, 2020

(30) Foreign Application Priority Data
Jan. 25, 2019  (JP) .............................. JP2019-011159

(51) Int. Cl.
*F02C 3/00* (2006.01)
*F02C 3/04* (2006.01)
*F02C 7/22* (2006.01)

(52) U.S. Cl.
CPC ................ *F02C 3/04* (2013.01); *F02C 7/222* (2013.01); *F05D 2220/32* (2013.01)

(58) Field of Classification Search
None
See application file for complete search history.

(56) References Cited

U.S. PATENT DOCUMENTS

| 9,388,988 B2 * | 7/2016 | Moehrle | F23R 3/60 |
| 2001/0027653 A1 * | 10/2001 | Mandai | F23R 3/10 |
| | | | 60/757 |

(Continued)

FOREIGN PATENT DOCUMENTS

| JP | 2003-148734 A | 5/2003 |
| JP | 2017-53276 A | 3/2017 |

OTHER PUBLICATIONS

German-language Office Action issued in German Application No. 10 2019 219 291.2 dated Mar. 15, 2021 with partial English translation (eleven (11) pages).

*Primary Examiner* — Edwin Kang
(74) *Attorney, Agent, or Firm* — Crowell & Moring LLP

(57) ABSTRACT

To suppress separation of air flows in air holes that are positioned in the outermost circumferential row in an air hole plate, but are far from a turn guide. A gas turbine combustor includes: an inner cylinder forming a combustion chamber; an outer cylinder forming a cylindrical outer circumference flow path through which compressed air flows, between the outer cylinder and the inner cylinder; an end cover closing an end portion of the outer cylinder; an air hole plate having air holes introducing the compressed air passed through the outer circumference flow path, into the combustion chamber; a plurality of fuel nozzles injecting a fuel into the combustion chamber via the air holes; a turn guide provided to the inner cylinder or the air hole plate and guiding a turn of the compressed air passed through the outer circumference flow path; and an auxiliary guide provided at an outer circumferential portion of a surface of the air hole plate facing the fuel nozzles, so as to be positioned on an inner circumference side with respect to the turn guide.

10 Claims, 11 Drawing Sheets

(56) References Cited

U.S. PATENT DOCUMENTS

| | | | | |
|---|---|---|---|---|
| 2002/0014078 A1* | 2/2002 | Mandai | .................... | F23R 3/286 |
| | | | | 60/737 |
| 2003/0037549 A1* | 2/2003 | Mandai | .................... | F23R 3/286 |
| | | | | 60/746 |
| 2003/0217544 A1* | 11/2003 | Sanderson | ................ | F23R 3/26 |
| | | | | 60/39.23 |
| 2007/0199327 A1* | 8/2007 | Tanimura | .................. | F23R 3/04 |
| | | | | 60/740 |
| 2008/0016876 A1* | 1/2008 | Colibaba-Evulet | ....... | F23R 3/14 |
| | | | | 60/776 |
| 2008/0245075 A1* | 10/2008 | Snyder | ...................... | F23R 3/14 |
| | | | | 60/748 |
| 2011/0067404 A1* | 3/2011 | Johnson | .................... | F23R 3/14 |
| | | | | 60/747 |
| 2013/0139511 A1* | 6/2013 | Sometani | ................ | F23R 3/286 |
| | | | | 60/722 |
| 2015/0135717 A1* | 5/2015 | Wada | ...................... | F23D 14/70 |
| | | | | 60/737 |
| 2017/0074519 A1* | 3/2017 | Abe | .......................... | F23R 3/10 |
| 2018/0112879 A1 | 4/2018 | Miura et al. | | |

* cited by examiner

GAS TURBINE COMBUSTOR, AND GAS TURBINE

BACKGROUND OF THE INVENTION

1. Field of the Invention

The present invention relates to a gas turbine combustor, and a gas turbine.

2. Description of the Related Art

As there is a social demand for reduction of negative environmental impacts, emphasis is placed in recent years on reduction of NOx emission amounts in development of gas turbine combustors also. One known method to reduce NOx emission amounts is uniform distribution combustion. Uniform distribution combustion is a method in which a fuel and air are both uniformly distributed, and supplied to a combustion chamber to be combusted, and generation of local high temperature areas can be reduced to thereby reduce NOx emission amounts. A large number of gas turbine combustors adopting uniform distribution combustion have been proposed, and, in one known gas turbine combustor for example, a large number of fuel nozzles are provided, and a large number of air holes are arranged coaxially with the individual nozzles, see JP-2003-148734-A, and the like.

Here, many of gas turbine combustors adopt a configuration in which a cylindrical outer circumference flow path is provided at the outer circumference of an inner cylinder, or combustor liner, and compressed air from a compressor is caused to flow through the outer circumference flow path to thereby cool the inner cylinder. The compressed air having passed through the outer circumference flow path makes a turn at an end portion of the combustor, and is supplied to a combustion chamber to be mixed with a fuel for combustion. The fuel mixed with the compressed air is then combusted in the combustion chamber. In this manner, if uniform distribution combustion is adopted in a structure where an air flow path makes a turn at an end portion of a combustor, the rate of an air flow flowing into air holes closer to the central axis of the combustor tends to increase, and the rate of an air flow flowing into air holes closer to the outer circumference tend to decrease. If deviations occur in the air flow rates, deviations occur also between fuel-air ratios in air holes, flame temperature rises locally in areas where the fuel concentration is high, and this becomes a cause of increase in NOx emission amounts. In addition, pressure loss that occurs when an air flow passes through air holes increases in areas where air flow rates are high, and this can lead also to deterioration of the overall efficiency of a gas turbine. Accordingly, it is an important problem in uniform distribution combustion to improve uniformity among the rates of air flows through air holes.

There is a known configuration made in view of this, in which a turn guide that smoothly continues from an outer circumference flow path to air holes in the outermost circumferential row is provided to an air hole plate provided with a large number of air holes, in order to reduce deviations of air flow rates by helping air flow into air holes closer to the outer circumference, see JP-2017-53276-A.

SUMMARY OF THE INVENTION

If a turn guide is formed in a ring-like form, even air holes in the outermost circumferential row have different radial positions in an air hole plate depending on the layout of air holes in relation to the air hole plate, which means the distances from the turn guide are different from each other. Since air holes positioned closer to the outer circumference are close to the turn guide, and components in the axial direction of the combustor are dominant in the velocity vectors of compressed air flowing into the air holes, separation of flows occurs less easily therein. However, since air holes positioned closer to the inner circumference are far away from the turn guide, and components in the radial direction of the combustor are large in the velocity vectors of compressed air flowing into the air holes, separation of flows occurs more easily therein, especially, at portions near their inlets.

An object of the present invention is to provide a gas turbine combustor, and a gas turbine that can suppress separation of air flows in air holes.

In order to achieve the object explained above, the present invention provides a gas turbine combustor configured to mix compressed air introduced from a compressor with a fuel to combust the fuel mixed with the compressed air, and to supply a produced combustion gas to a turbine, the gas turbine combustor including: an inner cylinder having a combustion chamber formed therein; an outer cylinder configured to cover the inner cylinder and form a cylindrical outer circumference flow path through which the compressed air flows, between the outer cylinder and the inner cylinder; an end cover configured to close an end portion of the outer cylinder on an opposite side from a side the turbine is located; an air hole plate that is inserted into an end portion on an end cover side of the inner cylinder and has a plurality of air holes that introduce the compressed air having passed through the outer circumference flow path and then dammed by the end cover into the combustion chamber; a plurality of fuel nozzles arranged on an end cover side with respect to the air hole plate such that the fuel is injected into the combustion chamber via associated air holes among the plurality of air holes; a turn guide provided to the inner cylinder or the air hole plate and configured to guide a turn of the compressed air having passed through the outer circumference flow path; and an auxiliary guide that is provided at an outer circumferential portion of a surface of the air hole plate facing the fuel nozzles so as to be positioned on an inner circumference side with respect to the turn guide and has a shape protruding radially inward when seen from the end cover.

According to the present invention, a gas turbine combustor, and a gas turbine that can suppress separation of air flows in air holes can be provided.

DESCRIPTION OF THE PREFERRED EMBODIMENTS

Hereinafter, embodiments of the present invention are explained with reference to the drawings.

First Embodiment

Gas Turbine Plant

Figure 1A:
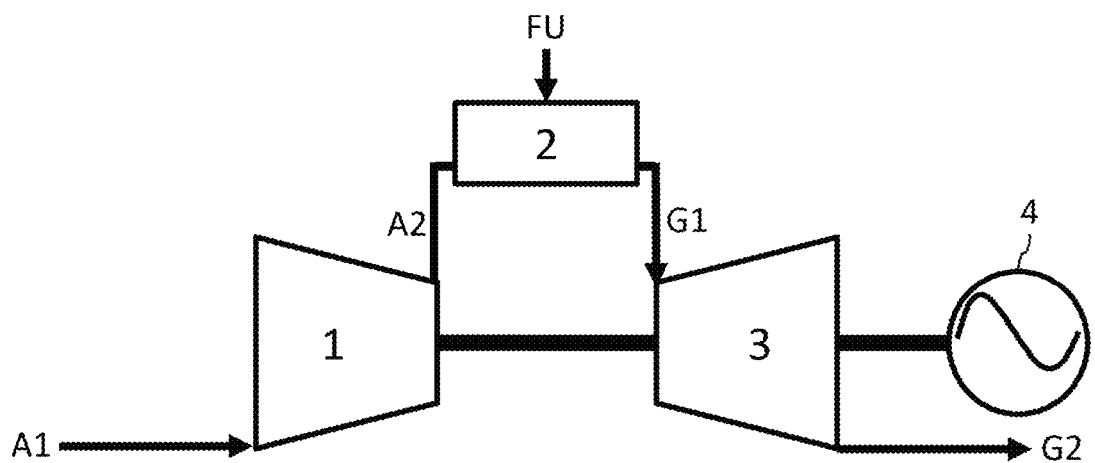
FIG. 1A is a schematic diagram of one example of a gas turbine plant to which a gas turbine combustor according to a first embodiment of the present invention is applied.

FIG. 1A is a schematic diagram of one example of a gas turbine plant to which a gas turbine combustor according to a first embodiment of the present invention is applied. The gas turbine plant illustrated in the figure includes a compressor 1, a gas turbine combustor, hereinafter, abbreviated to a combustor, 2, a turbine 3, and a load device 4. The compressor 1, the combustor 2, and the turbine 3 constitute a gas turbine to drive the load device 4. Although the load device 4 in the present embodiment is a power generator, a pump may be applied thereto. Note that, typically, a gas turbine is referred to as a "gas turbine engine" in some cases, and in those cases a turbine is referred to as a "gas turbine" in some cases.

The compressor 1 is rotation-driven by the turbine 3, compresses air A1 taken in from the inlet to produce high pressure compressed air, or combustion air, A2 which is to be supplied to the combustor 2. The combustor 2 mixes the compressed air A2 supplied from the compressor 1 with a fuel FU supplied from a fuel system, not illustrated, combusts the fuel mixed with the compressed air A2 to form flames FL, see FIG. 1B, and produces a high temperature combustion gas G1 which is to be supplied to the turbine 3. Although a liquid fuel may also be used as the fuel FU, the fuel FU in the present embodiment is a gas fuel. The turbine 3 is coupled coaxially with the compressor 1 and is rotation-driven by expansion of the combustion gas G1 supplied from the combustor 2. The combustion gas G1 that drove the turbine 3 is exhausted from the gas turbine as an exhaust gas G2. Part of the output power of the turbine 3 is used as motive power for the compressor 1, and the rest of the output power is use as motive power for the load device 4. The load device 4 is coupled coaxially with the compressor 1, and turbine 3, and converts the rotational output power of the turbine 3 into electrical power. Although a single-axis gas turbine is illustrated in the present embodiment, those to which the invention is applied include two-axis gas turbines. A two-axis gas turbine has a configuration in which a high-pressure turbine and low-pressure turbine whose rotational axes are separated from each other are included, the high-pressure turbine is coupled coaxially with a compressor, and the low-pressure turbine is coupled coaxially with the load device.

Gas Turbine Combustor

Figure 1B:
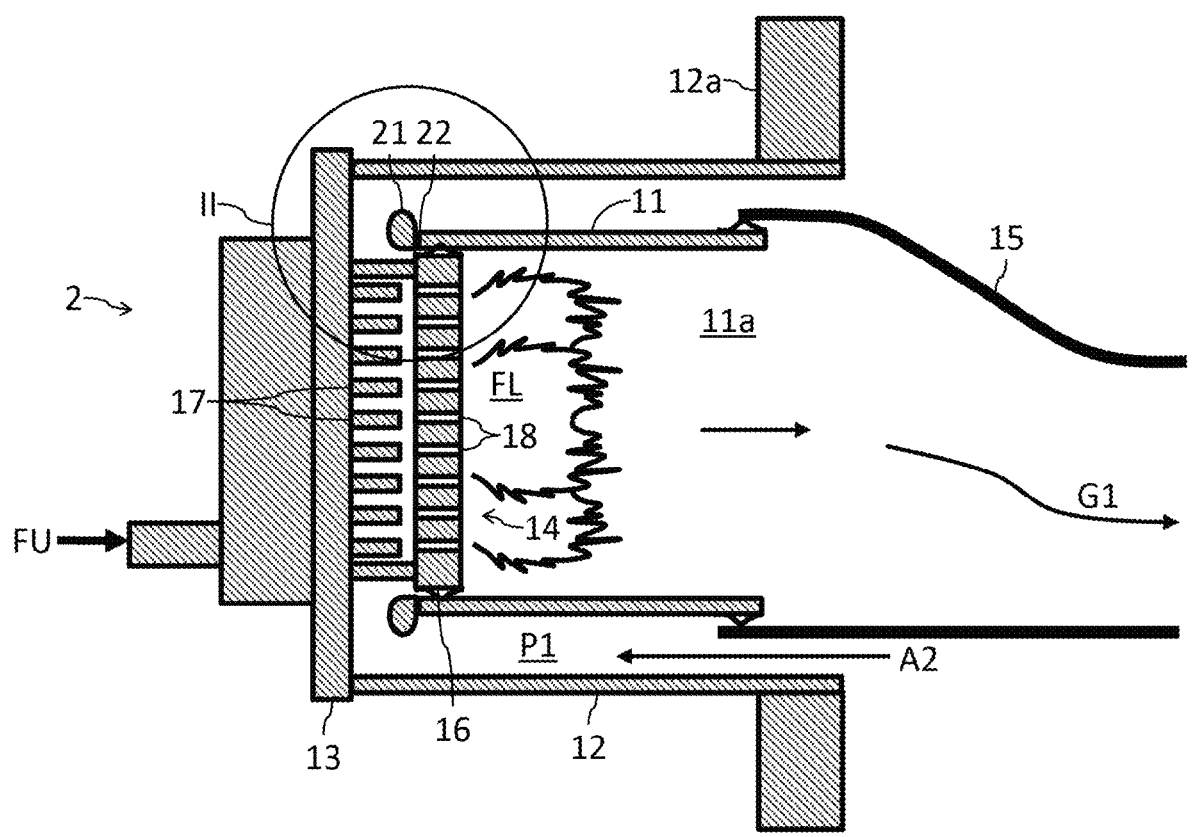
FIG. 1B is a schematic cross-sectional view representing the structure of the gas turbine combustor in FIG. 1A.

FIG. 1B is a schematic cross-sectional view representing the structure of the combustor in FIG. 1A. A plurality of such combustors 2 illustrated in the figure are attached to a casing, not illustrated, of the gas turbine in the circumferential direction. Each combustor 2 is configured to include an inner cylinder, or combustor liner, 11, an outer cylinder, or flow sleeve, 12, an end cover 13, a burner 14, a transition pipe, or transition piece, 15, and the like.

The inner cylinder 11 is a cylindrical member having a combustion chamber 11a formed therein, and serves as a partition between the compressed air A2 supplied from the compressor 1 and the combustion gas G1 produced by the combustor 2. An end portion on a turbine side of the inner cylinder 11, or the right side in the figure, is inserted into the transition pipe 15. An end portion on a turbine side of the transition pipe 15 is open to a working fluid flow path, not illustrated, of the turbine 3. The transition pipe 15 is a member to guide the combustion gas G1 produced in the combustion chamber 11a to the turbine 3.

The outer cylinder 12 is a cylindrical member, and covers the outer circumference of the inner cylinder 11 to form, between the outer cylinder 12 and the inner cylinder 11, a cylindrical outer circumference flow path P1 through which the compressed air A2 flows. It is configured to convectively cool the inner cylinder 11 by allowing the compressed air A2 to pass through the outer circumference flow path P1. In addition, the outer cylinder 12 includes a flange 12a at an end portion on a turbine side thereof, and is fixed to the casing of the gas turbine via the flange 12a. An end portion of the outer cylinder 12 opposite to a side the turbine is located, or the left side in the figure, is closed by the end cover 13. A large number of holes, not illustrated, are formed through the outer circumferential surface of the inner cylinder 11, and part of the compressed air A2 flowing through the outer circumference flow path P1 is guided to the combustion chamber 11a through the large number of holes provided in the inner cylinder 11, and is used for film-cooling of the inner circumferential surface of the inner cylinder 11. The rest of the compressed air A2 other than the part used for the film-cooling of the inner cylinder 11 flows through the outer circumference flow path P1, and is dammed by the end cover 13 to be reversed and supplied to the burner 14. The compressed air A2 guided to the burner 14 is injected into the combustion chamber 11a together with the fuel FU and the fuel FU mixed with the compressed air A2 is combusted.

Burner

Figure 2:
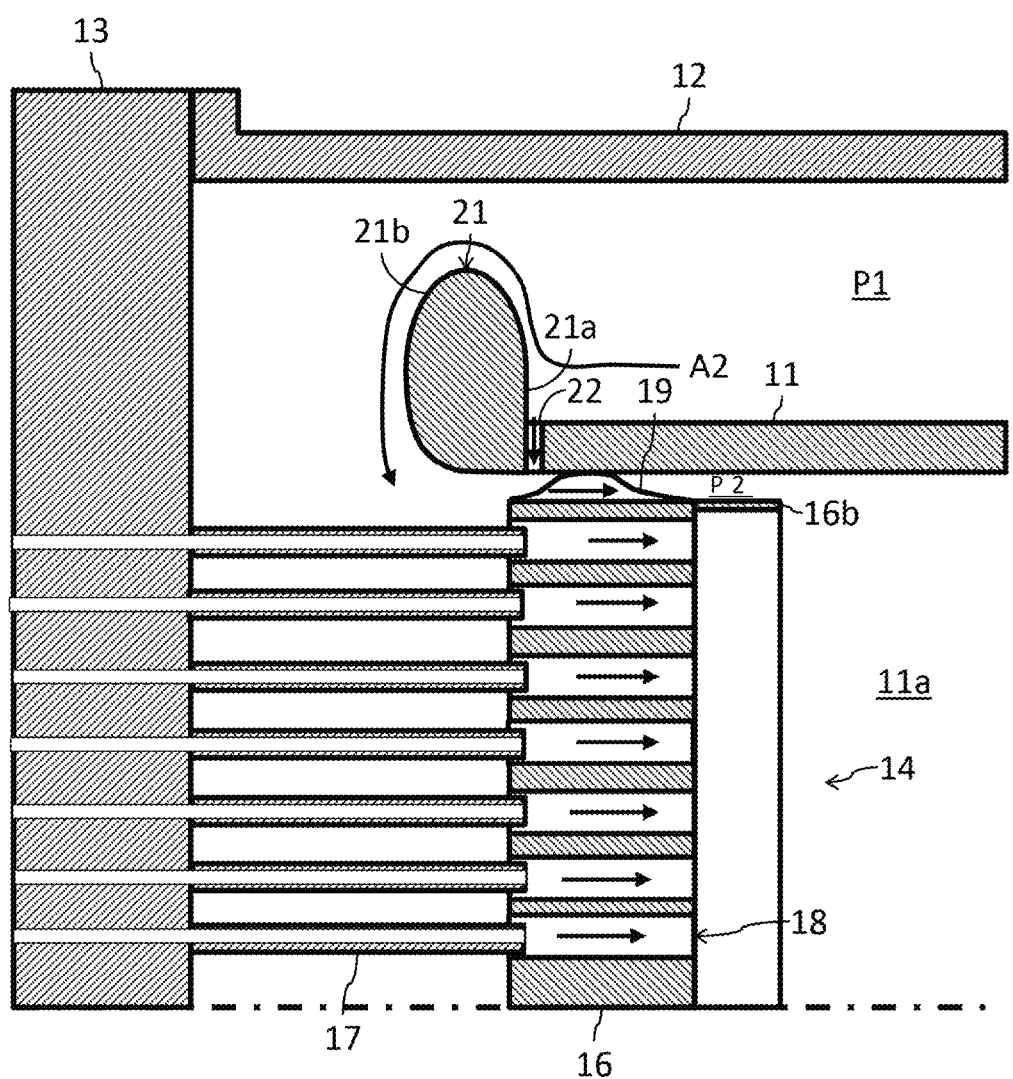
FIG. 2 is an enlarged view of the portion II in FIG. 1B.
Figure 3:
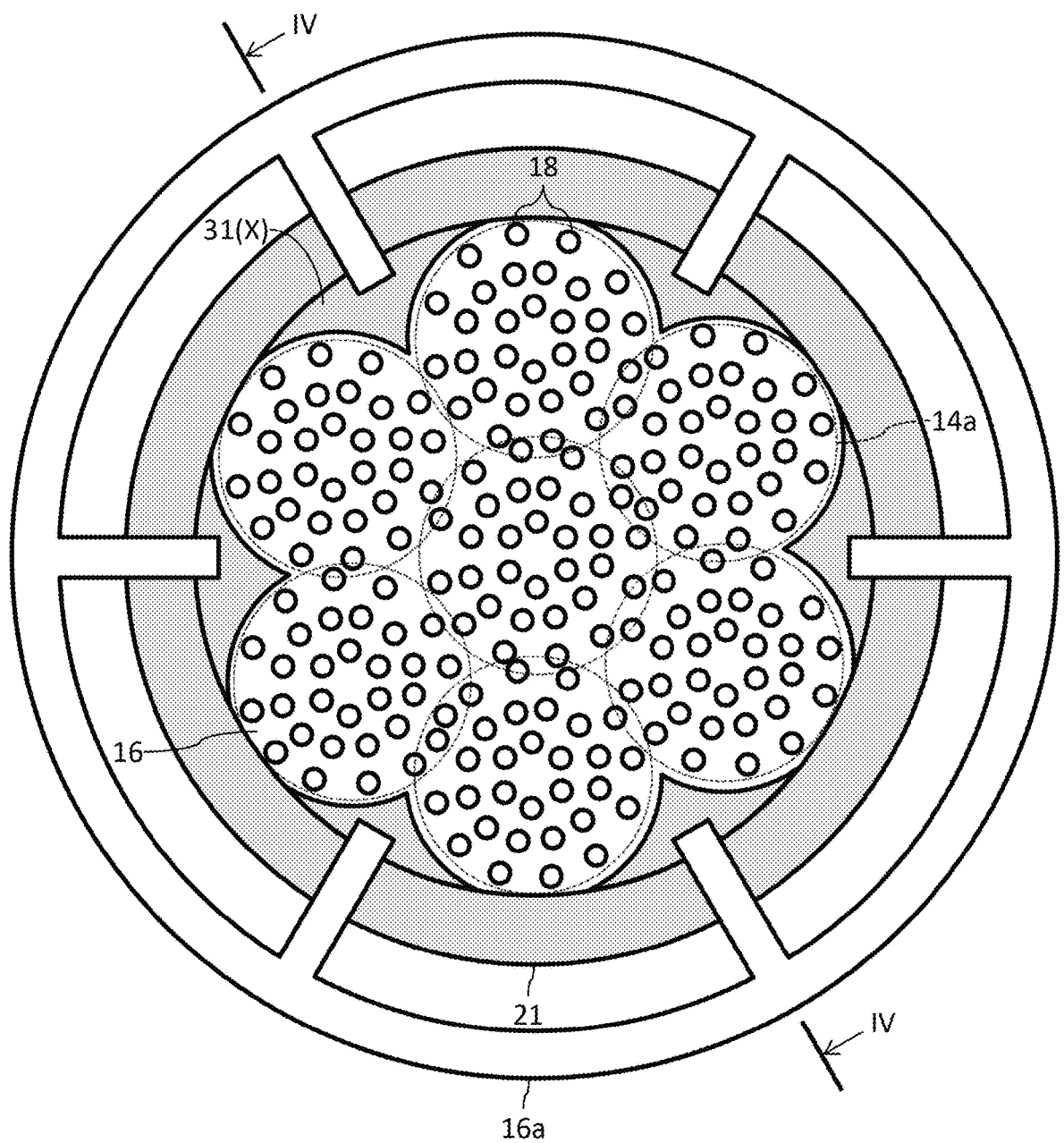
FIG. 3 is a configuration diagram of an air hole plate, and a turn guide seen from the side where an end cover is located.
Figure 4:
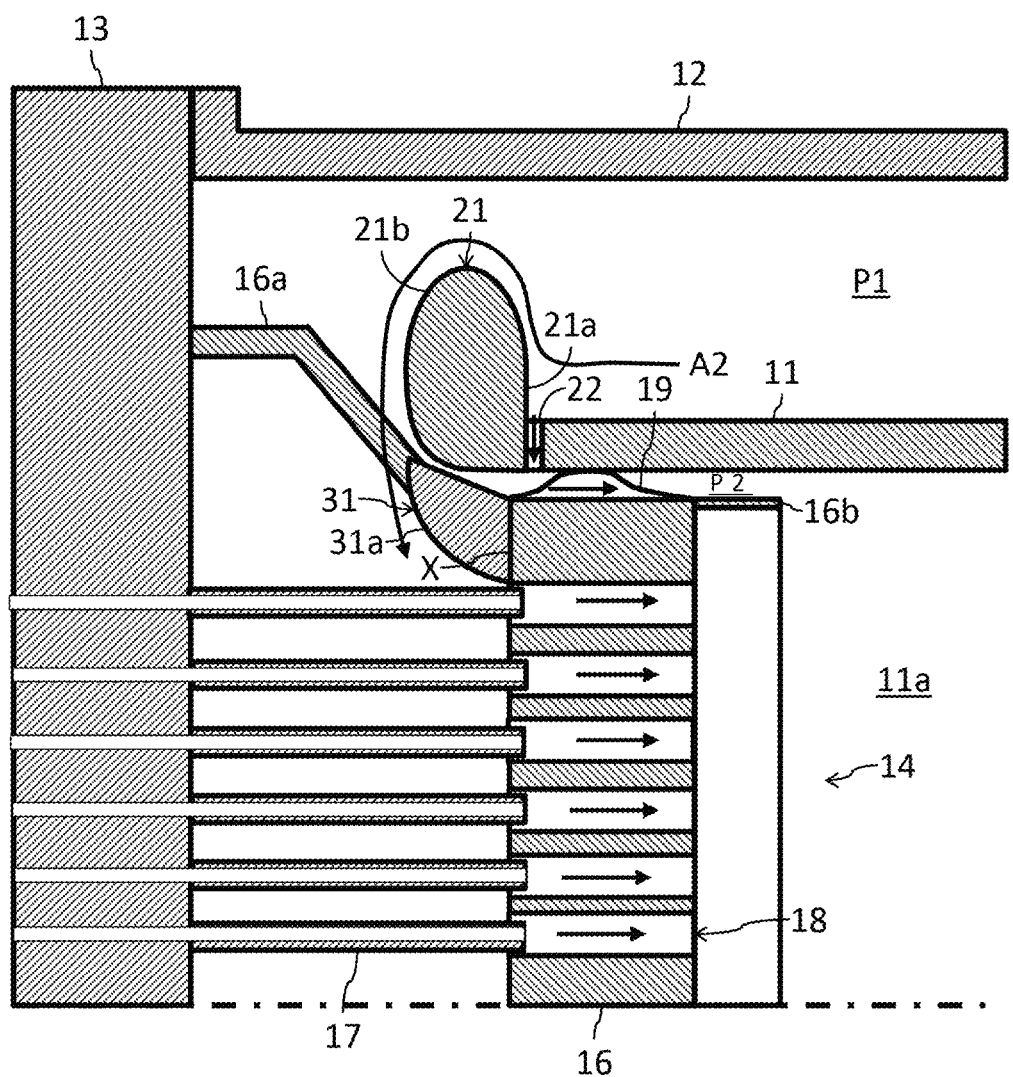
FIG. 4 is a cross-sectional view taken along the line IV-IV in FIG. 3.

FIG. 2 is an enlarged view of the portion II in FIG. 1B, FIG. 3 is a configuration diagram of an air hole plate and a turn guide seen from the side where the end cover is located, and FIG. 4 is a cross-sectional view taken along the line IV-IV in FIG. 3. The configuration of the burner 14 is explained with reference to FIG. 2 to FIG. 4 along with FIG. 1B. As illustrated in these figures, the burner 14 in the present embodiment includes an air hole plate 16 and a plurality of fuel nozzles 17.

The air hole plate 16 is a disc-like member, and is inserted into an end portion on an end cover side of the inner cylinder 11, or the left side in the figure, from the side where the end cover 13 is located. This air hole plate 16 is attached to the end cover 13 via a support 16a, see FIG. 3 and FIG. 4. A lip 16b which is a cylindrical member protrudes from an outer edge portion on a combustion chamber side of an end surface of the air hole plate 16 toward the combustion chamber 11a. The lip 16b is flush with the outer circumferential surface of the air hole plate 16. In addition, a spring seal 19 is interposed between the air hole plate 16 and the inner cylinder 11, or at an inner circumference flow path P2 formed between the outer circumferential surface of the air hole plate 16 and the inner circumferential surface of the inner cylinder 11. The air hole plate 16 is retained by the inner circumferential surface of the inner cylinder 11 via the spring seal 19. The spring seal 19 is not to completely seal the inner circumference flow path P2, but has a plurality of slits, not illustrated.

Figure 5:
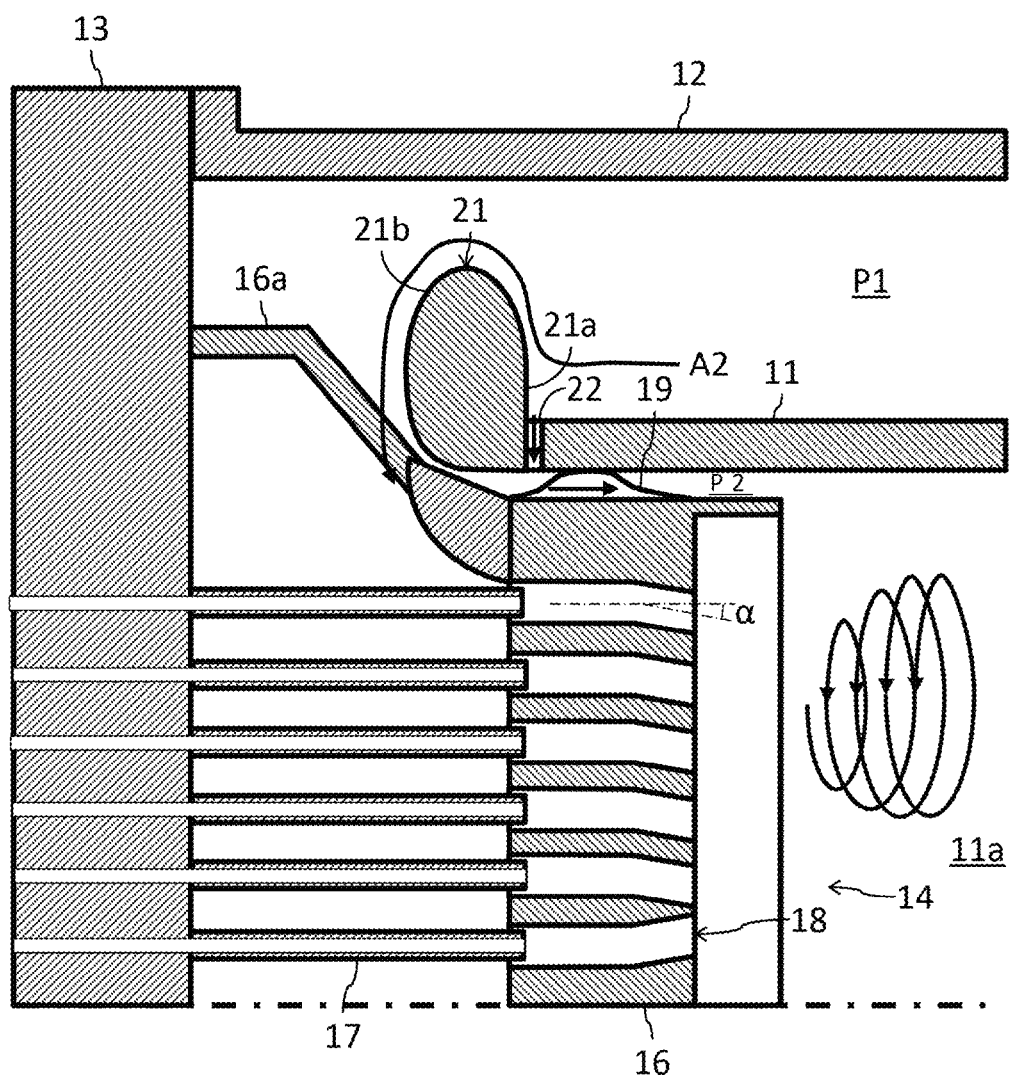
FIG. 5 is a figure representing another configuration example of a burner.

The air hole plate 16 is provided with a plurality of air holes 18 penetrating the air hole plate 16 toward the combustion chamber 11a from the side where the end cover is located. In the case illustrated in the present embodiment, a multi burner composed of a plurality of burners, hereinafter, referred to as partial burners 14a so as to distinguish them from the burner 14, is adopted as the burner 14. Note that, the present invention can also be applied to a gas turbine combustor using a burner 14 composed of a single partial burner 14a. An air hole group encircled by a broken-line circle in FIG. 3 constitutes one partial burner 14a and, in the configuration illustrated in the present embodiment, a partial burner 14a at the middle is surrounded by a plurality of, six in the present example, partial burners 14a. In each partial burner 14a, a plurality of air holes 18 form a plurality of concentric annular rows when seen from the end cover 13. Although FIG. 2 and FIG. 4 illustrate configurations in which the air holes 18 extend linearly along the central axis of the combustor, the air holes 18 are inclined in some configurations by an angle a with respect to the central axis of the combustor in order to form a swirl flow in the combustion chamber 11a as illustrated in FIG. 5. This applies also to each embodiment of a second embodiment and the latter embodiments.

The plurality of fuel nozzles 17 are arranged on an end cover side with respect to the air hole plate 16 so as to inject the fuel FU into the combustion chamber 11a via the corresponding air holes 18 among the plurality of air holes 18, and the plurality of fuel nozzles 17 form a uniform distribution combustion burner that distributes a fuel and air uniformly for combustion. In the configuration illustrated in the present embodiment, the fuel nozzles 17 are supported by the end cover 13. Individual fuel nozzles 17 extend parallel to the central axis of the combustor, and are arranged coaxially with corresponding air holes 18, or inlets of corresponding air holes 18, and tips of the fuel nozzles 17 are inserted into the air holes 18. In addition, the inner diameters of the air holes 18 are larger than the outer diameters of the fuel nozzles 17, and gaps into which the compressed air A2 flows are ensured between the outer circumferential surfaces of the fuel nozzles 17 and the inner circumferential surfaces of the air holes 18. Note that, in some configurations, the tips of the fuel nozzles 17 are not inserted into the air holes 18, and the fuel nozzles 17 are spaced apart from the air holes 18.

Turn Guide

In the present embodiment, a turn guide 21 and a plurality of cooling-air holes 22 are provided to the inner cylinder 11 at positions near the burner 14 such that they are positioned at a reversing portion of the flow path of the compressed air A2, or at an end portion on an end cover side of the outer circumference flow path P1. The turn guide 21 is a ring-like member that guides a turn of the compressed air A2 having passed through the outer circumference flow path P1 and reduces flow rate deviations of the compressed air A2 passing through individual air holes 18. The turn guide 21 in the present embodiment is a member separate from auxiliary guides 31 mentioned below. This turn guide 21 is provided at an end portion on an end cover side of the inner cylinder 11, or on the left side in the FIG. 2, and is configured to include a interference surface 21a and a guide surface 21b such that the turn guide 21 protrudes from the outer circumferential surface of the inner cylinder 11 toward the outer cylinder while being smoothly connected with the inner circumferential surface of the inner cylinder 11. The present embodiment illustrates an example in which the protrusion amount of the turn guide 21 from the outer circumferential surface of the inner cylinder 11 toward the outer cylinder is about 50% to 60% of the distance from the inner cylinder 11 to the outer cylinder 12, or of the thickness of the outer circumference flow path P1. It should be noted however that there is no particular limitation in this regard, and the protrusion amount may be smaller or larger.

The interference surface 21a is an element for interfering with and decelerating the flow of the compressed air A2 flowing along the outer circumferential surface of the inner cylinder 11 in the outer circumference flow path P1. The interference surface 21a faces the outer circumference flow path P1 so as to interfere with the compressed air A2 flowing near the outer circumferential surface of the inner cylinder 11 in the outer circumference flow path P1. In the example of the present embodiment, the planar interference surface 21a extending in the radial direction of the inner cylinder 11, that is, the planar interference surface 21a orthogonal to the central axis of the combustor, is illustrated.

The guide surface 21b is an element for guiding a turn of the compressed air A2 having been interfered and decelerated by the interference surface 21a after passing through the outer circumference flow path P1, and actively guiding the compressed air A2 to air holes 18 arranged on an outer circumference side of the air hole plate 16. The guide surface 21b is constituted by a curved surface, and smoothly connects the inner circumferential surface of the inner cylinder 11 and the interference surface 21a. Specifically, this guide surface 21b extends from the interference surface 21a toward the outer cylinder, turns to form an arc toward the end cover, or counterclockwise in the cross-section of FIG. 2, and eventually extends toward the turbine to continue to the inner circumferential surface of the inner cylinder 11. As illustrated in FIG. 2 and FIG. 4, in cross-sections cut along a plane including the central axis of the combustor, the turn guide 21 has a cross-sectional shape that is similar to the one formed if a thick flange is provided to the inner cylinder 11 and is rounded off at its corners, or smoothened. An edge portion of the guide surface 21b closest to the end cover 13 is positioned closer to the end cover than an end surface of the air hole plate 16 closer to the end cover is.

In the inner cylinder 11, the plurality of cooling-air holes 22 are provided along the interference surface 21a of the turn guide 21. The plurality of the cooling-air holes 22 are provided at constant intervals in the circumferential direction at the outer circumferential surface of the inner cylinder 11. The cooling-air holes 22 in the present embodiment are positioned closer to the end cover than the spring seal 19 is, and connect the outer circumference flow path P1 and the inner circumference flow path P2.

Auxiliary Guide

In the present embodiment, a plurality of the auxiliary guides 31 are provided so as to be positioned on an inner circumference side with respect to the turn guide 21. These auxiliary guides 31 are provided at intervals therebetween at an outer circumferential portion of a surface of the air hole plate 16 facing the fuel nozzles 17, i.e., a surface facing the end cover 13, and protrude from the surface facing the fuel nozzles 17 toward the end cover 13. The auxiliary guides 31 and the air hole plate 16 constitute a single body, and may be joined together after they are prepared separately, or may be formed integrally from the beginning by a method such as single-body machining. The auxiliary guides 31 in the present embodiment are members separate from the turn guide 21 as mentioned above. Note that, in a variant, each pair of auxiliary guides 31 that are adjacent to each other in the circumferential direction of the air hole plate 16 may be connected together, and all the auxiliary guides 31 may be connected together to form a single member.

When seen from the end cover 13, the individual auxiliary guides 31 have a shape protruding radially inward from the outer circumference of the air hole plate 16, or the inner circumference of the turn guide 21. Specifically, when seen from the end cover 13, in each triangular area X, see FIG. 3 and FIG. 4, surrounded by two partial burners 14a that are adjacent to each other in the circumferential direction and the outer circumference of the air hole plate 16, each auxiliary guide 31 is formed in a shape corresponding to the area X. The auxiliary guides 31 are provided at positions corresponding to the areas X. As a result, the number of partial burners 14a in the outer circumferential row of the air hole plate 16 and the number of the auxiliary guides 31 are the same, six in the present embodiment. The support 16a mentioned above, see FIG. 3 and FIG. 4, is arranged between each pair of partial burners 14a that are adjacent to each other in the circumferential direction in order to reduce the influence on the flow of the compressed air A2 into the air holes 18, and is coupled with the air hole plate 16 via the auxiliary guides 31 in the present embodiment. That is, the support 16a directly connects the auxiliary guides 31 and the end cover 13. In addition, the support 16a is connected to the auxiliary guides 31 from the radially outer side as illustrated in FIG. 3 and FIG. 4.

Then, the auxiliary guides 31 have the guide surfaces 31a formed with curved surfaces. The guide surfaces 31a are curved surfaces which are protruded toward the center line of the air hole plate 16 and the end cover 13. When seen in a cross-section, see FIG. 4, cut along a plane including the center line of the air hole plate 16, the guide surfaces 31a have smooth turns from a direction toward the radial center, or center line, of the air hole plate 16 to a direction toward the turbine, that is, a direction toward the combustion chamber 11a. There are no steps or corners in the guide surfaces 31a. In addition, the positions, in the axial direction of the combustor, of edge portions on respective end cover sides of the turn guide 21 and auxiliary guides 31 are aligned with each other, forming guide surfaces which are extended radially inward beyond the guide surface 21b with the guide surfaces 31a being added to the guide surface 21b. The guide surfaces 31a are configured to cooperate with the guide surface 21b to guide the compressed air A2 having passed through the outer circumference flow path P1 radially inward slightly farther, see FIG. 4, as compared with a flow path only along the guide surface 21b, or the flow illustrated in FIG. 2. In the present embodiment, as illustrated in FIG. 4, the auxiliary guides 31 extend toward the end cover 13 while being inclined radially outward, the gaps between the guide surfaces 21b and 31a are reduced, and the influence on a flow when it passes across the gaps between the guide surfaces 21b and 31a is reduced.

The auxiliary guides 31 are formed according to the layout of the air holes 18, specifically the shape of the radially outermost circumferential row of the air holes 18 in the air hole plate 16. Putting it other way around, the air holes 18 in the outermost circumferential row of the air hole plate 16 are arranged along the turn guide 21 or the auxiliary guides 31. It should be noted however that the outermost circumferential row of the air hole plate 16 mentioned here is different from the outermost circumferential row of the partial burners 14a, the air holes 18 of all the partial burners 14a are seen as one air hole group, and the outermost circumferential row of the air hole plate 16 refers to the row of air holes which are in the air hole group and are positioned closest to the outer circumference. The outermost circumferential row of the air hole plate 16 is the row constituted by air holes 18 beyond which other air holes are not present on the outer side along straight lines extending radially outward from the center of the air hole plate 16. Then, the auxiliary guides 31 have, on their inner-circumference side, recessed and protruded shapes corresponding to the arrangement of the air holes 18 in the outermost circumferential row. This means that the shapes of the auxiliary guides 31 protrude radially inward at circumferential positions where air holes 18 in the outermost circumferential row are positioned on the radially inner side as compared to other air holes 18 in the outermost circumferential row.

Operation

While the gas turbine is in operation, the air A1 is taken into the compressor 1 to be compressed and is discharged from the compressor 1 as the high pressure compressed air A2. The compressed air A2 discharged from the compressor 1 is supplied to the combustor 2 and is mixed with the fuel FU supplied from a fuel system, not illustrated, and the fuel mixed with the air is burned. The thus-produced high temperature combustion gas G1 drives the turbine 3, and rotational output power of the turbine 3 drives the load device 4.

A flow of a working fluid in the combustor 2 during this operation is explained. First, in the combustor 2, the area outside the inner cylinder 11 is supplied with the compressed air A2 to have a raised pressure which is higher than the pressure in the combustion chamber 11a, or than the pressure in the inner space of the inner cylinder 11, that supplies the combustion gas G1 to the turbine 3. Accordingly, the compressed air A2 having passed through the outer circumference flow path P1 and dammed by the end cover 13 is reversed by being pulled back due to the pressure difference explained above to flow into the air holes 18 of the air hole plate 16. Simultaneously, the fuel FU is injected from the fuel nozzles 17 into the air holes 18, and the fuel FU and the compressed air A2 that are in a mixed state are ejected from each air hole 18 into the combustion chamber 11a. In addition, part of the compressed air A2 flows into the inner circumference flow path P2 between the inner cylinder 11 and the air hole plate 16 from a flow path inlet on an end cover side and the cooling-air holes 22, flows through the inner circumference flow path P2 to cool the air hole plate 16, and are ejected into the combustion chamber 11a.

At this time, part of the compressed air A2 that flows near the outer circumferential surface of the inner cylinder 11 in the outer circumference flow path P1 is interfered and decelerated by the interference surface 21a of the turn guide 21 to recover static pressure in the present embodiment. The compressed air A2 interfered by the interference surface 21a and having lost momentum is sucked into the cooling-air holes 22, or makes a small turn to be guided by the guide surface 21b of the turn guide 21 and then sucked into the air holes 18 positioned relatively closer to the outer circumference of the air hole plate 16 or into the inner circumference flow path P2. In addition, a partial flow of the compressed air A2 that is guided by the guide surface 21b of the turn guide 21, and passes near the support 16a is sucked into the inner circumference flow path P2 through gaps between the guide surfaces 21b and 31a, or is guided by the guide surfaces 31a of the auxiliary guides 31 to flow into the air holes 18. In this manner, flow rate deviations at inner and outer circumferences of the air hole plate 16 are reduced by actively guiding the compressed air A2 also toward the outer circumference of the air hole plate 16 with the guide surfaces 21b and 31a.

Comparative Example

Figure 11:
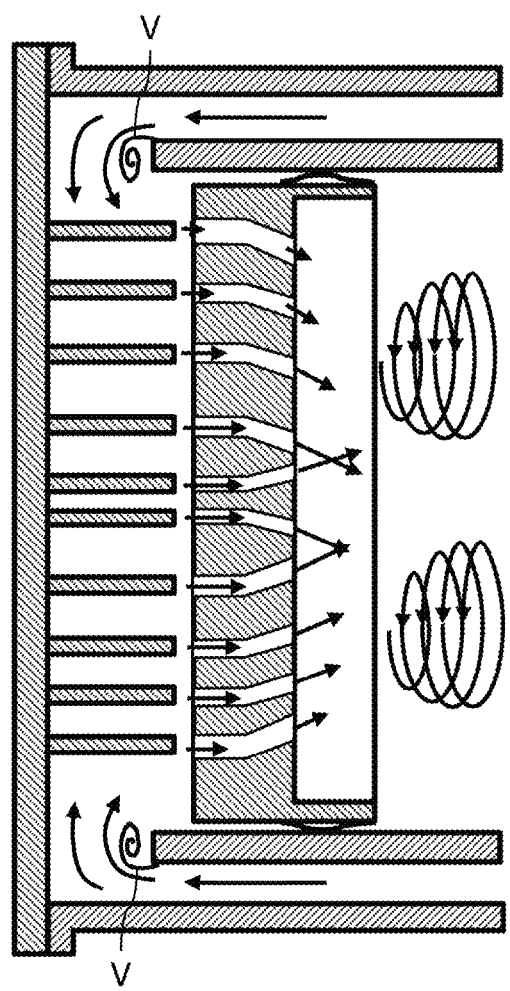
FIG. 11 is a partial cross-sectional view of a gas turbine combustor according to one comparative example.

FIG. 11 is a partial cross-sectional view of a gas turbine combustor according to one comparative example. In the gas turbine combustor illustrated in the figure, there are no turn guides at an end portion of an inner cylinder. In this case, separation vortexes V occur at a reversing portion of a flow path due to a flow of compressed air having passed through an outer circumference flow path, and the air flows into air holes on the outer circumference side of an air hole plate less easily. As a result, deviations between air flow rates at air holes on the inner circumference side of the air hole plate and air holes on the outer circumference side of the air hole plate increase. In particular, the fuel concentration in an air-fuel mixture that is ejected from the air holes on the outer circumference side of the air hole plate into a combustion chamber increases, and this becomes a cause of increase in NOx emission amounts. In addition, since the flow rate of compressed air passing through air holes on the inner circumference side of the air hole plate increases, pressure loss may increase.

Effect (1) In the present embodiment, part of the compressed air A2 flowing through the outer circumference flow path P1 is interfered by the interference surface 21a of the turn guide 21, and the decelerated compressed air A2 is guided toward the outer circumference of the burner 14 by the guide surface 21b. Thereby, occurrences of the separation vortexes V illustrated in the example of FIG. 11 can be reduced, deviations of the air flow rates between the inner-circumference side and outer-circumference side of the burner 14 can be reduced, and also generation of NOx can be reduced.

Here, without the auxiliary guides 31, part of the compressed air A2 having been guided by the turn guide 21 collides with the areas X which are located at an end cover side end surface of the air hole plate 16 and where there are no air holes 18, and flows along the end surface of the air hole plate 16 taking a shorter course. This flow flows into air holes 18 that are present in its advancing direction soon, but the flow flows along the end surface of the air hole plate 16; as a result, the radially inward velocity component becomes dominant, and the flow gets separated inside the air holes 18 more easily.

In contrast, the auxiliary guides 31 are installed on the inner side of the turn guide 21 in the present embodiment to thereby guide the compressed air A2, which is otherwise guided into the areas X if there is only the turn guide 21, further with the auxiliary guides 31. The compressed air A2 guided by the auxiliary guides 31 makes a detour avoiding the areas X, and flows into air holes 18 arranged along the auxiliary guides 31 taking a slightly longer course away from the turn guide 21 with velocity vectors having large components in the axial direction of the combustor. Separation inside the air holes 18 occurs less easily with the flow of the compressed air A2 having flowed into the air holes 18 in this manner. Accordingly, it is possible to suppress separation of air flows inside the air holes 18 that are positioned in the outermost circumferential row of the air hole plate 16, but are far from the turn guide 21.

(2) Since the auxiliary guides 31 have the guide surfaces 31a having smooth turns from the direction toward the center of the air hole plate 16 to the direction toward the turbine, it is possible to cause the flow of the compressed air A2 to turn smoothly, and to flow into air holes 18 in the axial direction effectively.

(3) The auxiliary guides 31 are members separate from the turn guide 21, and the turn guide 21 is provided at an end cover side end portion of the inner cylinder 11. Since the turn guide 21, and the inner cylinder 11 form a single body, the center of the turn guide 21 matches the center of the inner cylinder 11, and it is possible to suppress variations of the amounts of protrusions of the turn guide 21 from the outer circumferential surface of the inner cylinder 11 due to variations in the positional relation between the turn guide 21 and the inner cylinder 11 resulting from assembling or machining accuracy. If there are variations in the amounts of protrusions of the turn guide 21 in the outer circumference flow path P1, there can be deviations in the rates of air flows flowing into individual air holes 18, but increase in the deviations can be suppressed by forming the turn guide 21 and the inner cylinder 11 as a single body. It should be noted however that in attaining the essential effect (1) explained above, the turn guide 21 and the inner cylinder 11 may be separate members as described in a second embodiment, a fourth embodiment, and the like.

(4) If the turn guide 21 is provided to the inner cylinder 11, the support 16a has to be connected to the air hole plate 16 parallel to or approximately parallel to the central axis of the combustor, in order to avoid interference by the turn guide 21. In this regard, since the auxiliary guides 31 are installed to protrude from the air hole plate 16 toward the end cover 13, it is possible to support the air hole plate 16 by accessing the support 16a from the radially outer side by using those auxiliary guides 31. By enlarging the distances between air holes 18 and the support 16a in this manner, it is possible to reduce the influence of the support 16a on air flows flowing into individual air holes 18. It should be noted however that in attaining the essential effect (1) explained above, it is not necessary to connect the support 16a to the air hole plate 16 via the auxiliary guides 31.

(5) Since the interference surface 21a of the turn guide 21 facing the outer circumference flow path P1 extends in the radial direction of the inner cylinder 11, it is possible to help the compressed air A2 turn along the compressed air A2 by actively making the flow of the compressed air A2 flowing through the outer circumference flow path P1 interfered and decelerated by the interference surface 21a. As a result, the compressed air A2 can be guided efficiently to air holes 18 closer to the outer circumference of the air hole plate 16 with the guide surface 21b.

Second Embodiment

Figure 6:
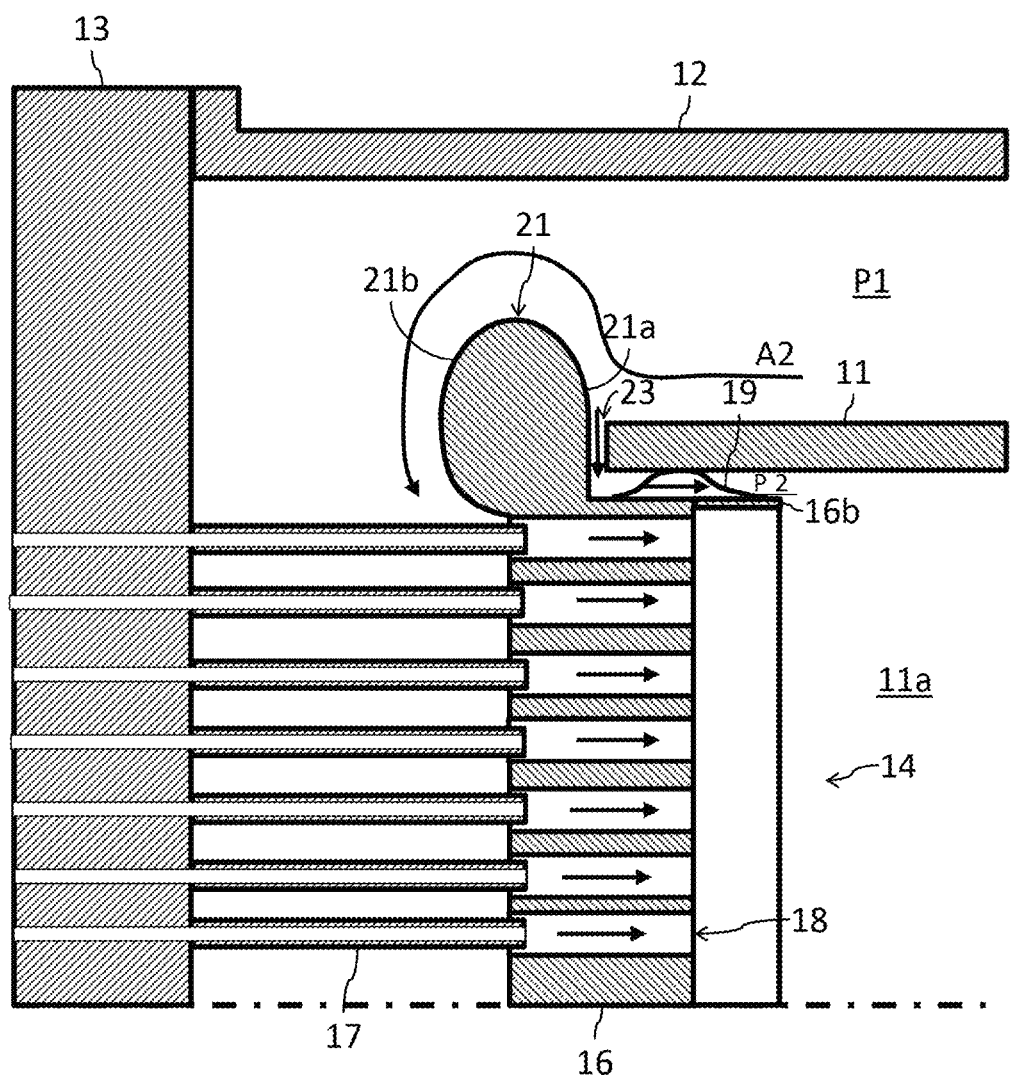
FIG. 6 is a partial cross-sectional view representing the structure of main parts of a gas turbine combustor according to a second embodiment of the present invention.
Figure 7:
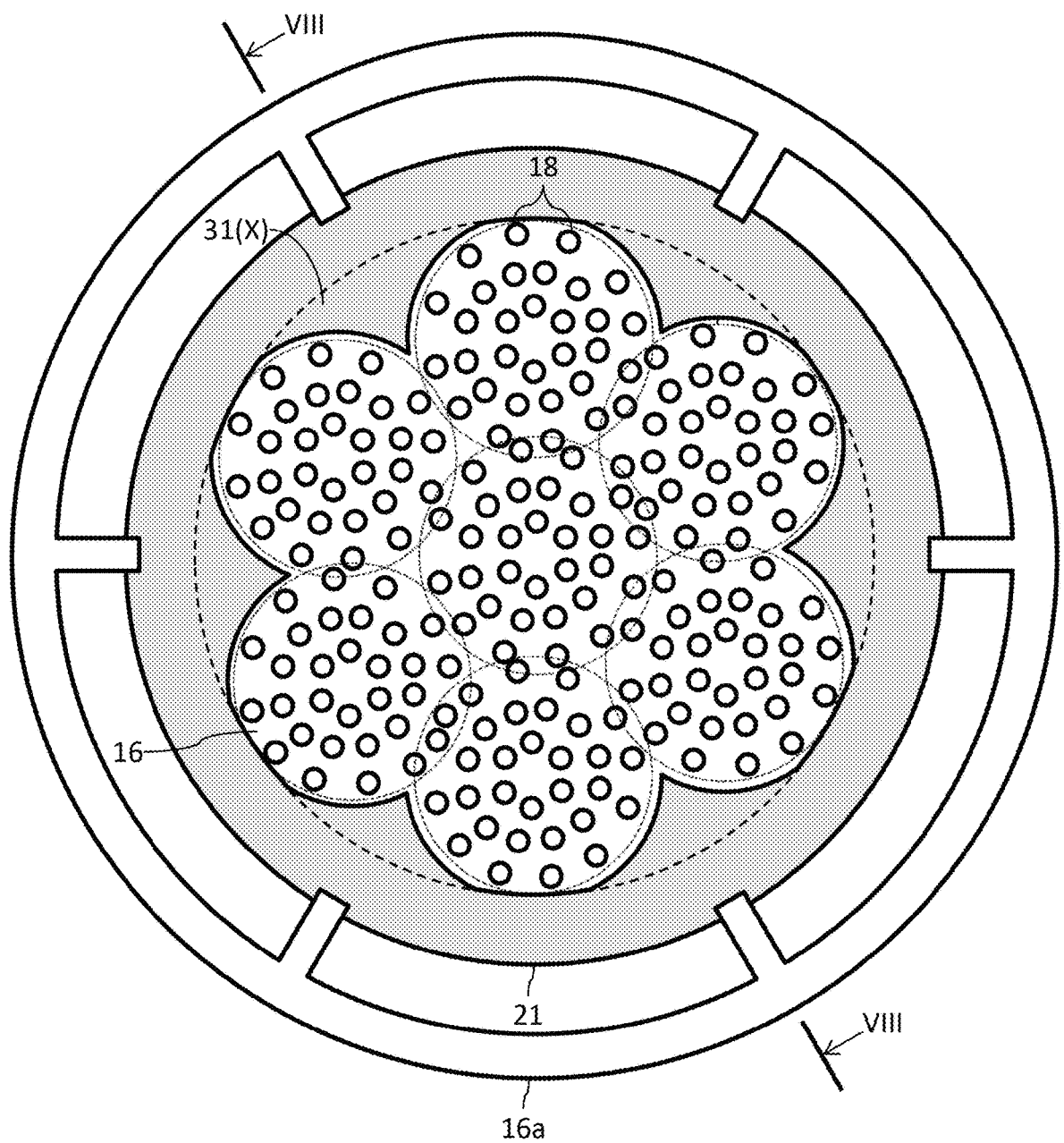
FIG. 7 is a configuration diagram of an air hole plate and a turn guide seen from the side where the end cover is located in the gas turbine combustor according to the second embodiment of the present invention.
Figure 8:
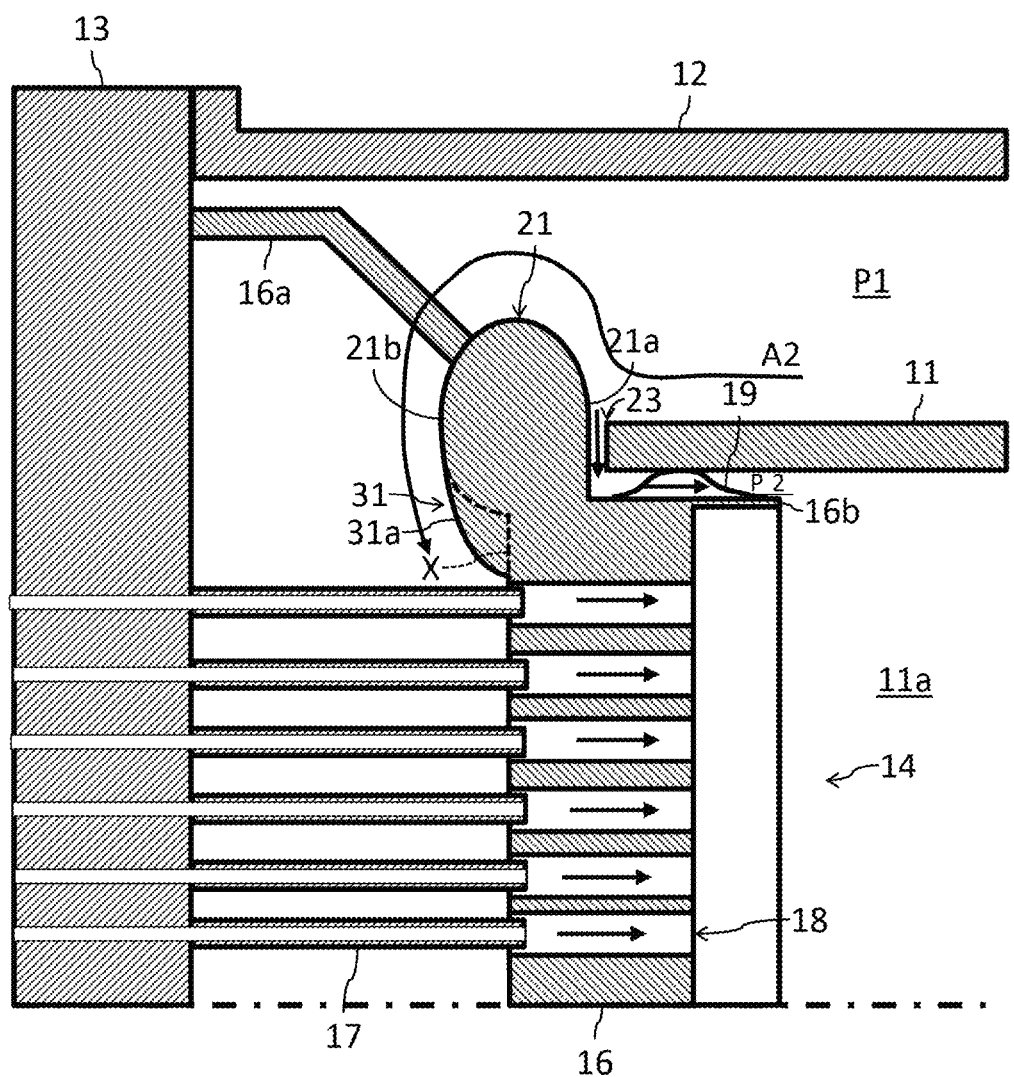
FIG. 8 is a cross-sectional view taken along the line VIII-VIII in FIG. 7.

FIG. 6 is a partial cross-sectional view representing the structure of main parts of a gas turbine combustor according to a second embodiment of the present invention, FIG. 7 is a configuration diagram of an air hole plate and a turn guide in the present embodiment seen from the side where the end cover is located, and FIG. 8 is a cross-sectional view taken along the line VIII-VIII in FIG. 7. FIG. 6, FIG. 7, and FIG. 8 correspond to FIG. 2, FIG. 3, and FIG. 4 illustrating the first embodiment, respectively. Elements in the present embodiment that are the same as or correspond to those in the embodiment explained already are given the same signs in FIG. 6 to FIG. 8 as those in the drawings already mentioned, and explanations thereof are omitted as appropriate.

The present embodiment is different from the first embodiment in that the auxiliary guides 31 are provided to the air hole plate 16 integrally with the turn guide 21 in the present embodiment. That is, in the present embodiment, the turn guide 21 is provided to the air hole plate 16, and is formed integrally with the auxiliary guides 31. Specifically, the present embodiment provides a configuration in which the auxiliary guides 31 protrude radially inward from the inner circumferential surface of the turn guide 21 at a plurality of circumferential positions. In other words, this is a structure in which parts that protrude radially inward as compared to other circumferential positions are the auxiliary guides 31, and the turn guide 21 is connected on their outer-circumference side. The positions and sizes of the auxiliary guides 31, and the shapes of the guide surfaces 31a are substantial the same as those in the first embodiment. The support 16a connects the turn guide 21 to the end cover, and is coupled with the turn guide 21 from the radially outer outside. In addition, since the turn guide 21 is provided to the air hole plate 16 in the present embodiment, a gap 23 between an end cover side end surface of the inner cylinder 11 and the interference surface 21a of the turn guide 21 serves as the inlet of the inner circumference flow path P2. This inlet also corresponds to the cooling-air holes 22, see FIG. 2, in the first embodiment. The structure of the present embodiment is the same as that in the first embodiment in other respects.

In the present embodiment also, effects similar to those in the first embodiment can be attained since the auxiliary guides 31 are provided. In addition, since the auxiliary guides 31 are formed integrally with the turn guide 21, gaps and steps between the turn guide 21 and the auxiliary guides 31 can be eliminated, and the capability of the auxiliary guides 31 as a guide for the compressed air A2 can be improved further. In addition, since the turn guide 21 is provided to the air hole plate 16, the distance between the inlet of each air hole 18 and the support 16a can be made larger by connecting the turn guide 21 and the end cover 13 with the support 16a.

Third Embodiment

Figure 9:
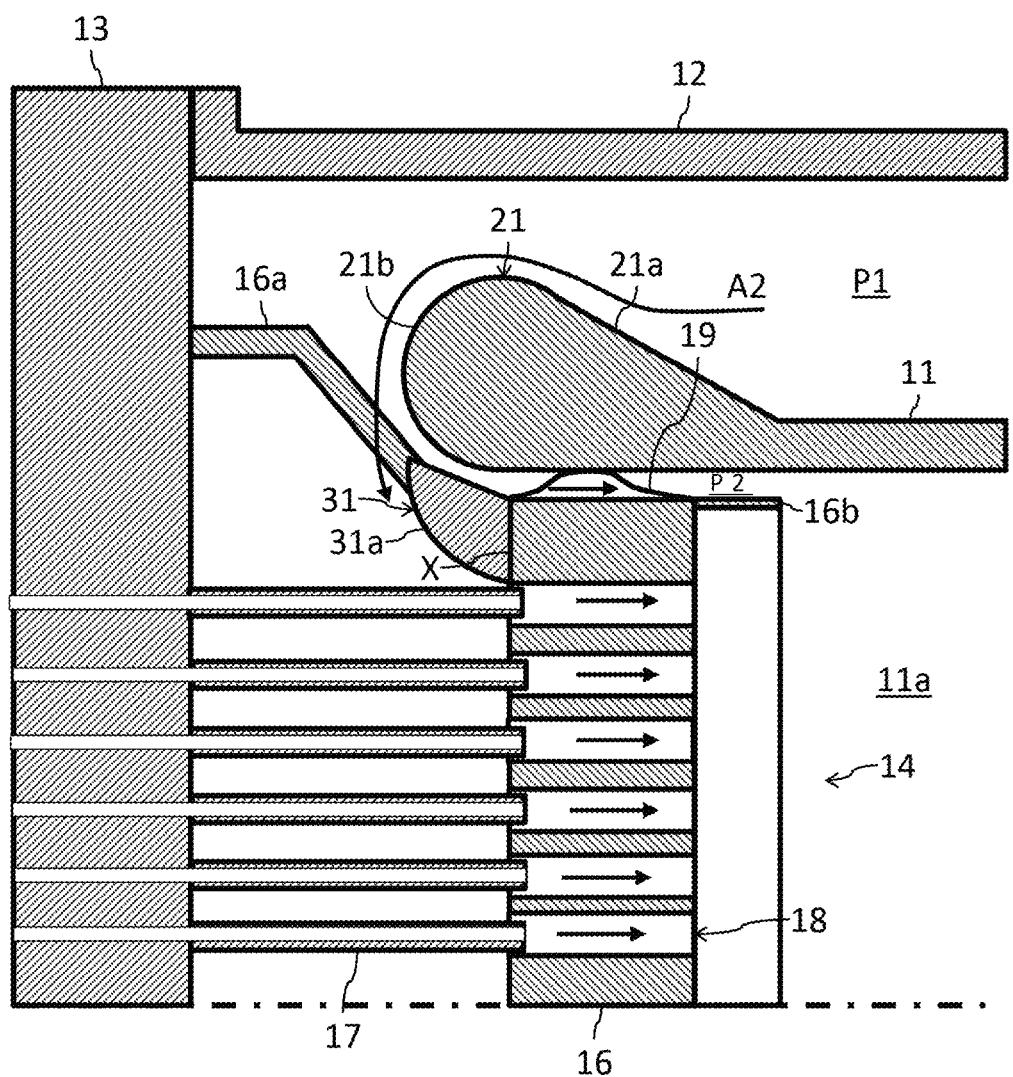
FIG. 9 is a partial cross-sectional view representing the structure of main parts of a gas turbine combustor according to a third embodiment of the present invention.

FIG. 9 is a partial cross-sectional view representing the structure of main parts of a gas turbine combustor according to a third embodiment of the present invention, and corresponding to FIG. 4 illustrating the first embodiment. Elements in the present embodiment that are the same as or correspond to those in the embodiments explained already are given the same signs in FIG. 9 as those in the drawings already mentioned, and explanations thereof are omitted as appropriate.

The present embodiment is different from the first embodiment in that the interference surface 21a of the turn guide 21 is inclined toward the end cover, or the left side in FIG. 9, relative to the radially outward direction of the inner cylinder 11 in the present embodiment. Specifically, the present embodiment provides a configuration in which the angle that the interference surface 21a forms with the outer circumferential surface of the inner cylinder 11 is smaller than the angle that the interference surface 21a forms with a surface orthogonal to the outer circumferential surface of the inner cylinder 11. Although the cooling-air holes 22 are omitted, they may be provided similar to the first embodiment. The configuration is the same as that in the first embodiment in other respects.

In the present embodiment also, effects similar to those in the first embodiment can be attained by installing the auxiliary guides 31. In addition, the interference surface 21a of the turn guide 21 is inclined along the flow of the compressed air A2 flowing through the outer circumference flow path P1. This is a configuration in which an emphasis is placed on suppression of separation of a flow from the interference surface 21a. With this configuration, the compressed air A2 can be caused to reach the guide surface 21b more smoothly.

Fourth Embodiment

Figure 10:
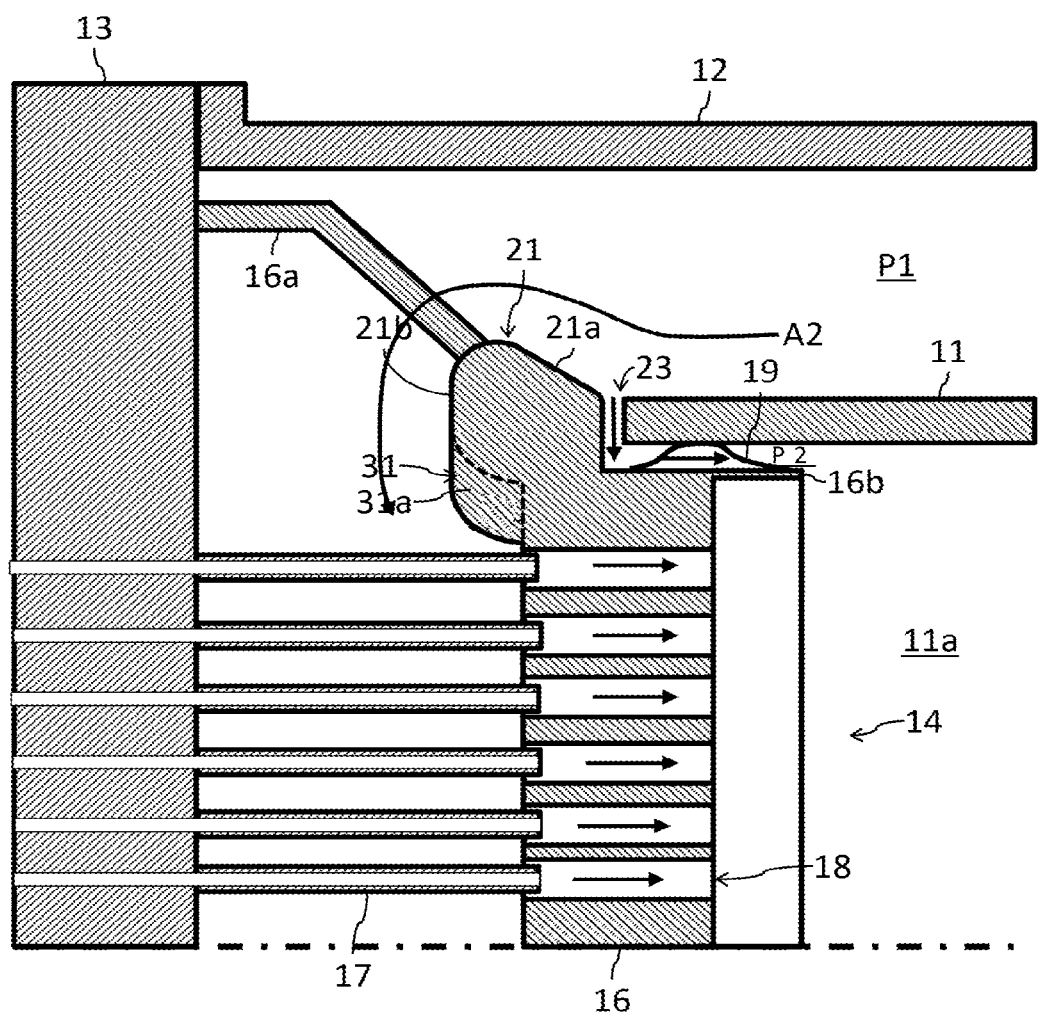
FIG. 10 is a partial cross-sectional view representing the structure of main parts of a gas turbine combustor according to a fourth embodiment of the present invention.

FIG. 10 is a partial cross-sectional view representing the structure of main parts of a gas turbine combustor according to a fourth embodiment of the present invention, and corresponding to FIG. 4 illustrating the first embodiment. Elements in the present embodiment that are the same as or correspond to those in the embodiments explained already are given the same signs in FIG. 10 as those in the drawings already mentioned, and explanations thereof are omitted as appropriate.

The present embodiment is an example realized by combining the configurations of the second embodiment and third embodiment. That is, the present embodiment provides a configuration in which the auxiliary guides 31 are provided to the air hole plate 16 integrally with the turn guide 21, and the interference surface 21a of the turn guide 21 is inclined toward the end cover relative to the radially outward direction of the inner cylinder 11. According to the present embodiment, the effects that can be attained in the second embodiment and third embodiment can be attained. In this manner, individual embodiments can be combined as appropriate, and effects corresponding to a combination can be attained.

(Variant)

As mentioned above, the present invention can be applied not only to a multi burner, but also to a gas turbine combustor using a burner 14 composed of a single partial burner 14a. For example, if pitches between air holes in the outermost circumferential row are large, the auxiliary guides 31 can be installed between adjacent air holes in one configuration. In addition, as disclosed in JP-2010-256003-A for example, if a configuration in which some air holes in an air hole row are omitted is applied to air holes in the outermost circumferential row of a single burner, areas from which air holes are omitted can be used for the auxiliary guides 31.

What is claimed is:

1. A gas turbine combustor configured to mix compressed air introduced from a compressor with a fuel to combust the fuel mixed with the compressed air, and to supply a produced combustion gas to a turbine, the gas turbine combustor comprising:
    an inner cylinder having a combustion chamber formed therein;
    an outer cylinder configured to cover the inner cylinder and form a cylindrical outer circumference flow path through which the compressed air flows, between the outer cylinder and the inner cylinder;
    an end cover configured to close an end portion of the outer cylinder on an opposite side from a side the turbine is located;
    an air hole plate that is inserted into an end portion on an end cover side of the inner cylinder, has a plurality of air holes that introduce the compressed air having passed through the cylindrical outer circumference flow path and then dammed by the end cover into the combustion chamber and has a plurality of air hole groups including the plurality of air holes;

a plurality of fuel nozzles arranged on an end cover side with respect to the air hole plate such that the fuel is injected into the combustion chamber via associated air holes among the plurality of air holes;

a turn guide provided to the inner cylinder or the air hole plate and configured to guide a turn of the compressed air having passed through the cylindrical outer circumference flow path; and an auxiliary guide that is provided at an outer circumferential portion of a surface of the air hole plate facing the plurality of fuel nozzles so as to be positioned on an inner circumference side with respect to the turn guide, wherein when seen from the end cover, the auxiliary guide has a shape protruding radially inward which forms a triangular area, wherein the triangular area is formed by adjacent outer circumferences of two of the plurality of air hole groups that are adjacent to each other in a circumferential direction and an outer circumference of the air hole plate, wherein the inner circumference side of the auxiliary guide corresponds to the adjacent outer circumferences of the two of the plurality of air hole groups, wherein when seen in a cross-section cut along a plane including a center line of the air hole plate, the auxiliary guide in the triangular area has a guide surface formed with a curved surface that has a smooth turn from a direction toward a center of the air hole plate to a direction toward the turbine.

2. The gas turbine combustor according to claim 1, wherein
air holes of the plurality of air holes in a radially outermost circumferential row of the air hole plate are arranged along the turn guide or the auxiliary guide.

3. The gas turbine combustor according to claim 1, wherein
the turn guide is a member separate from the auxiliary guide, and is provided at the end portion on the end cover side of the inner cylinder.

4. The gas turbine combustor according to claim 3, further comprising:
a support configured to connect the auxiliary guide and the end cover.

5. The gas turbine combustor according to claim 1, wherein
the turn guide is provided to the air hole plate integrally with the auxiliary guide.

6. The gas turbine combustor according to claim 5, further comprising:
a support configured to connect the turn guide and the end cover.

7. The gas turbine combustor according to claim 1, wherein
the turn guide is configured to include an interference surface facing the cylindrical outer circumference flow path, and a guide surface formed with a curved surface that guides the turn of the compressed air having passed through the cylindrical outer circumference flow path.

8. The gas turbine combustor according to claim 7, wherein
the interference surface extends in a radial direction of the inner cylinder.

9. The gas turbine combustor according to claim 7, wherein
the interference surface is inclined toward the end cover relative to a radially outward direction of the inner cylinder.

10. A gas turbine comprising:
a compressor that compresses air to discharge compressed air;

a gas turbine combustor configured to mix the compressed air introduced from the compressor with a fuel to combust the fuel mixed with the compressed air, and to supply a produced combustion gas to a turbine, the gas turbine combustor comprising:
an inner cylinder having a combustion chamber formed therein;

an outer cylinder configured to cover the inner cylinder and form a cylindrical outer circumference flow path through which the compressed air flows, between the outer cylinder and the inner cylinder;

an end cover configured to close an end portion of the outer cylinder on an opposite side from a side the turbine is located;

an air hole plate that is inserted into an end portion on an end cover side of the inner cylinder, has a plurality of air holes that introduce the compressed air having passed through the cylindrical outer circumference flow path and then dammed by the end cover into the combustion chamber and has a plurality of air hole groups including the plurality of air holes;

a plurality of fuel nozzles arranged on an end cover side with respect to the air hole plate such that the fuel is injected into the combustion chamber via associated air holes among the plurality of air holes;

a turn guide provided to the inner cylinder or the air hole plate and configured to guide a turn of the compressed air having passed through the cylindrical outer circumference flow path; and an auxiliary guide that is provided at an outer circumferential portion of a surface of the air hole plate facing the plurality of fuel nozzles so as to be positioned on an inner circumference side with respect to the turn guide, wherein when seen from the end cover, the auxiliary guide has a shape protruding radially inward which forms a triangular area, wherein the triangular area is formed by adjacent outer circumferences of two of the plurality of air hole groups that are adjacent to each other in a circumferential direction and an outer circumference of the air hole plate, wherein the inner circumference side of the auxiliary guide corresponds to the adjacent outer circumferences of the two of the plurality of air hole groups, wherein when seen in a cross-section cut along a plane including a center line of the air hole plate, the auxiliary guide in the triangular area has a guide surface formed with a curved surface that has a smooth turn from a direction toward a center of the air hole plate to a direction toward the turbine; and the turbine configured to be driven by the produced combustion gas produced by the gas turbine combustor.

* * * * *